No. 881,941. PATENTED MAR. 17, 1908.
E. McKAY & B. C. LAYTON.
AUTOMATIC BOX ADJUSTING MECHANISM.
APPLICATION FILED OCT. 1, 1906.

WITNESSES. INVENTORS.
O. B. Baenziger. Edward McKay
James F. Hill. Bert C. Layton
By their Attorney
Newell S. Wright.

UNITED STATES PATENT OFFICE.

EDWARD McKAY AND BERT C. LAYTON, OF ADDISON TOWNSHIP, OAKLAND COUNTY, MICHIGAN.

AUTOMATIC BOX-ADJUSTING MECHANISM.

No. 881,941.  Specification of Letters Patent.  Patented March 17, 1908.

Application filed October 1, 1906. Serial No. 336,843.

*To all whom it may concern:*

Be it known that we, EDWARD McKAY and BERT C. LAYTON, citizens of the United States, residing in the township of Addison, county of Oakland, State of Michigan, have invented a certain new and useful Improvement in an Automatic Box-Adjusting Mechanism, of which the following is a specification, reference being had to the accompanying drawings, which form a part of this specification.

Our invention has for its object an automatic box adjusting mechanism for adjusting boxes on arbors or shafts, and may be employed whereever it may be desired to have an adjustable box.

Figure 1:
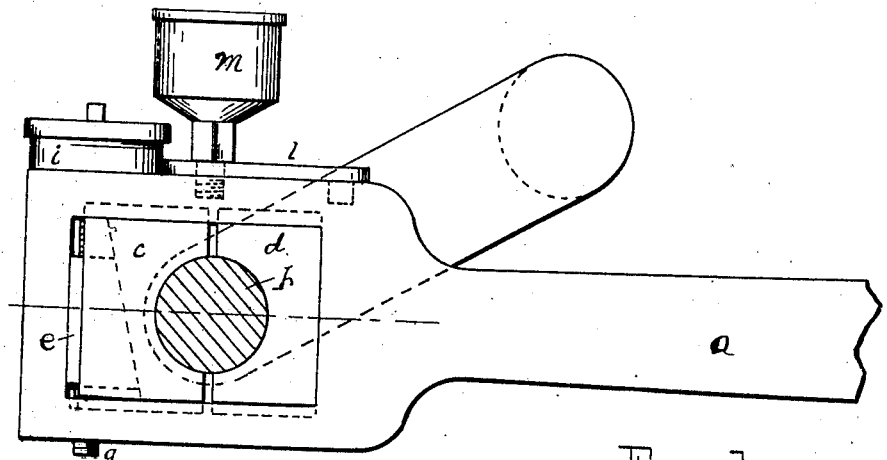
Figure 2:
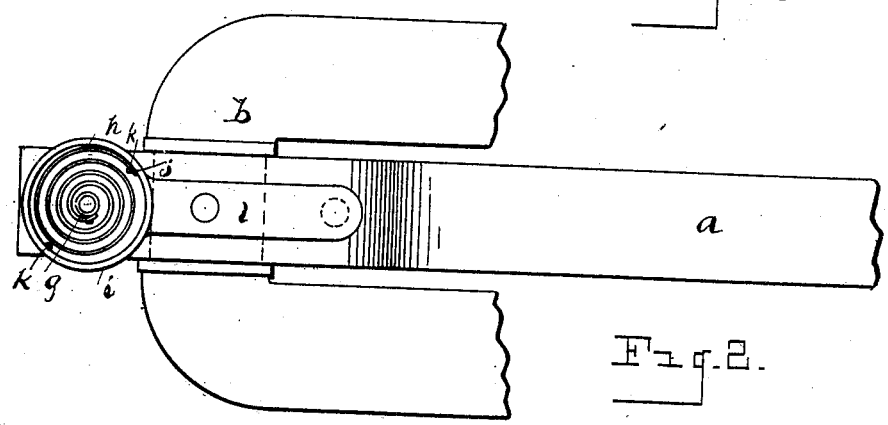
Figures 3, 4:
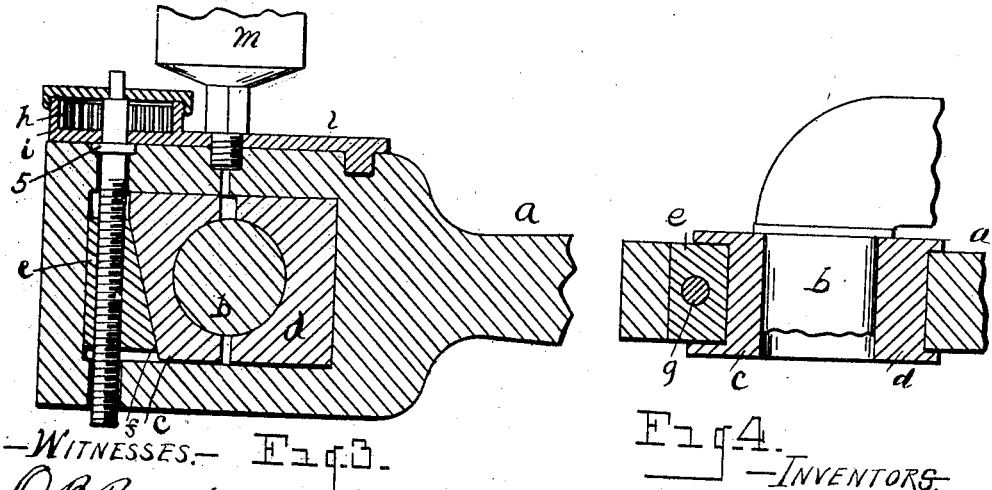

We carry out our invention as hereinafter described and claimed and illustrated in the accompanying drawings, in which, Figure 1 is a view in side elevation. Fig. 2 is a plan view with the cover of the spring case and the oil cup removed. Fig. 3 is a longitudinal sectional view. Fig. 4 is a detail view showing the box and mechanism in horizontal section.

The desirability of a simple and efficient device for automatically adjusting a box upon a journal or arbor will readily be understood.

We carry out our object as follows: In the drawings $a$ represents, for example, a connecting rod provided with a strap or end piece to receive a journal $b$, as for example a crank pin or arm. We illustrate our invention simply as applied to a connecting rod and crank pin, but it will be understood that we do not confine ourselves to this particular use of our improved mechanism. A divided bearing is indicated at $c, d$, located within the strap or end piece about said journal, the parts $c, d$ being made, for example, of brass, one of the parts or brasses of the box having an adjustable engagement upon the journal or crank pin. To adjust the adjustable brasses or portion of the box a wedge $e$ is employed located between the adjacent inner face of the journal and the adjustable bearing, and bearing upon an adjacent wedge shaped surface of the bearing indicated at $f$. Through the wedge $e$ is passed a threaded bolt $g$ provided with a shoulder 5, one end of the bolt being engaged by the spring $h$ on the outside of the strap or end piece, a coiled spring being shown herewith, the opposite end of the spring being engaged with an inclosing case $i$, as indicated at $j$. The tension of the spring may be adjusted in any suitable manner. We have shown the inner periphery of the case provided with engaging lugs $k, k$ on opposite sides thereof, whereby the spring may be engaged with either of said lugs to increase or diminish the tension of the spring, as may be required. It will be evident that the spring when tension is applied thereto, will exert its tension upon the threaded bolt to turn the bolt. The bolt in consequence of its threaded engagement with the wedge will obviously thus have a tendency to draw the wedge upward correspondingly to tighten the adjacent parts upon the arbor. The spring will evidently exert a continuous and automatic tension upon the bolt, thereby to adjust the brass upon the arbor without any attention from the attendant. The case of the spring may be engaged in place in any suitable manner. We have shown the case provided with an arm $l$ through which is passed a customary lubricating cup, indicated at $m$, the stem of the cup holding the spring case in place. No particular means need to be provided to adjust the tension of the spring, as the end which engages the case may be simply disengaged therefrom by a pair of nippers, and the spring drawn up to a desired tension, the end of the spring then being engaged with the case and will not be likely to require any further attention, unless it should be found that the tension was too great or too little, but when the proper adjustment has been secured, the tension, as above stated, will need no further care, and the bearing will be adjusted upon the journal or arbor to continually take up any wear which may take place.

What we claim as our invention is:

1. The combination with an adjustable bearing of a wedge engaged with one face of the bearing, a bolt having a threaded engagement with the wedge to move the wedge relative to the bearing, and a spring about one end of the bolt to exert its tension upon the bolt.

2. The combination with an adjustable bearing of a wedge adjacent to one face of the bearing, a bolt having a threaded engagement with the wedge to move the wedge relative to the bearing, a spring to exert its tension upon the threaded bolt, and a case for the spring, said spring having one extremity engaged with the bolt and the other extremity with the case.

3. The combination with an adjustable bearing having a continuous wedge shaped face on one side thereof, of a wedge having a continuous wedge shaped face on one side thereof bearing against the wedge shaped face of the bearing, a bolt having a threaded engagement with the wedge to move the wedge relative to the bearing, and a spring about one end of the bolt to exert an automatic tension upon the bolt.

4. The combination with a strap of a journal therewithin, a divided bearing about the journal within the strap, a wedge located between the inner face of the strap and the adjacent face of the divided bearing, a bolt having a threaded engagement with the wedge, and a spring to exert its tension upon the bolt to automatically move the wedge relative to the adjacent bearing to force the bearing upon the journal, the wedge and the adjacent face of the bearing having continuous wedge shaped surfaces.

5. The combination with a strap of a journal therewithin, a divided bearing within the strap about the journal, one portion of said bearing being adjustable and having a continuous wedge shaped surface, a wedge having a continuous wedge shaped surface located between the wedge shaped surface of the adjustable bearing and the adjacent face of the strap, a bolt having a threaded engagement with the wedge, and a spring about one end of the bolt to exert an automatic tension upon the bolt to move the wedge relative to the bearing to force the adjustable bearing upon the journal.

6. The combination with a strap of a journal therewithin, a divided bearing within the strap about the journal, one portion of said bearing being adjustable and provided with a wedge shaped face, a wedge located between the wedge shaped face of the adjustable bearing and the adjacent inner face of the strap, a bolt having a threaded engagement with the wedge and projecting to the extremity of the strap, a spring upon an outer extremity of the bolt exterior to the strap to move the wedge relative to the bearing, and a case inclosing the spring.

In testimony whereof, we have signed this specification in the presence of two subscribing witnesses.

EDWARD McKAY.
BERT C. LAYTON.

Witnesses:
HAYDEN F. SPENCER,
DWIGHT W. TOLES.